US008046703B2

(12) United States Patent
Busch et al.

(10) Patent No.: US 8,046,703 B2
(45) Date of Patent: Oct. 25, 2011

(54) MONITORING AND INTEGRATION OF AN ORGANIZATION'S PLANNING PROCESSES

(75) Inventors: Carsten Busch, Weinheim (DE); Sabine Finke, Karlsruhe (DE); Dina Glatzel, Heidelberg (DE); Andreas Holle, Wiesloch (DE); Boris Kneisel, Mannheim (DE); Martina Rothley, Schwetzingen (DE); Ingrid Van Skyhawk, Muelhausen (DE); Dirk Saager, Karisruhe (DE)

(73) Assignee: SAP AG, Walldorf (DE)

( * ) Notice: Subject to any disclaimer, the term of this patent is extended or adjusted under 35 U.S.C. 154(b) by 267 days.

(21) Appl. No.: 11/364,270

(22) Filed: Feb. 28, 2006

(65) Prior Publication Data

US 2007/0203775 A1     Aug. 30, 2007

(51) Int. Cl.
*G06F 3/048* (2006.01)
*G06F 3/00* (2006.01)

(52) U.S. Cl. ........................................ 715/764; 715/751

(58) Field of Classification Search ................... 715/764, 715/751
See application file for complete search history.

(56) References Cited

U.S. PATENT DOCUMENTS

| | | | | |
|---|---|---|---|---|
| 6,560,589 | B1 * | 5/2003 | Stier et al. ........................ | 706/50 |
| 6,725,428 | B1 * | 4/2004 | Pareschi et al. ................ | 715/205 |
| 6,907,428 | B2 | 6/2005 | Fitzpatrick et al. | |
| 6,995,768 | B2 | 2/2006 | Jou et al. | |
| 7,467,355 | B1 * | 12/2008 | Zukowski et al. ............. | 715/765 |
| 7,653,566 | B2 * | 1/2010 | Kim et al. ..................... | 705/7.13 |
| 7,769,794 | B2 * | 8/2010 | Moore et al. ................. | 707/831 |
| 2002/0065701 | A1 * | 5/2002 | Kim et al. ......................... | 705/9 |
| 2003/0036994 | A1 * | 2/2003 | Witzig et al. ................... | 705/38 |
| 2003/0135558 | A1 * | 7/2003 | Bellotti et al. ................ | 709/206 |
| 2003/0135559 | A1 * | 7/2003 | Bellotti et al. ................ | 709/206 |
| 2003/0135659 | A1 * | 7/2003 | Bellotti et al. ................ | 709/313 |
| 2003/0216986 | A1 * | 11/2003 | Hassan ............................ | 705/35 |
| 2003/0233387 | A1 * | 12/2003 | Watanabe et al. ............. | 709/100 |
| 2004/0103026 | A1 * | 5/2004 | White ............................. | 705/14 |
| 2005/0043982 | A1 * | 2/2005 | Nguyen ............................ | 705/8 |
| 2005/0234577 | A1 * | 10/2005 | Loughran et al. ............. | 700/100 |

OTHER PUBLICATIONS

Microsoft Excel. Copyright 2003.*
Blattner, Patrick. "Special Edition USing Microsoft Excel. 2002." Copyright Date: May 18, 2001. Safari Online.*
Cognos Planning Brochure, [online]. Version date Apr. 2005. Retrieved from the Internet: URL: http://www.cognos.com/pdfs/factsheets/fs_cognos_planning.pdf, , publication date unknown.

* cited by examiner

*Primary Examiner* — Doug Hutton, Jr.
*Assistant Examiner* — Soumya Dasgupta
(74) *Attorney, Agent, or Firm* — Buckley, Maschoff & Talwalkar LLC

(57) ABSTRACT

A planning monitor and control system is provided for use with an enterprise computing system. The system generates a user interface planning visual display that includes a list view area containing a list of planning projects predefined to be included in a list of planning projects of interest to a user. At least one of the listed planning projects includes an electronically linked electronic planning document that is created and maintained in an application software program module of the enterprise computing system that is separate from the planning monitor and control system. Planning information is generated in the linked planning document as part of the listed planning project to which the planning document is associated. The planning visual display also includes a planning project details view area in which non-final content from the linked planning document is displayed for the associated planning project included in the list view.

26 Claims, 6 Drawing Sheets

MONITORING AND INTEGRATION OF AN ORGANIZATION'S PLANNING PROCESSES

TECHNICAL FIELD

This document relates to computer-implemented monitoring and integration of various planning processes that are performed within an organization.

BACKGROUND

In many businesses, various planning processes occur throughout the business organization. For example, there may be a planning process that a sales group of the business is responsible to perform, a planning process that a financial or accounting group of the business is responsible to perform, and a planning process that a purchasing group of the business is responsible to perform. Various other planning processes may also be performed by these and other groups within and perhaps outside the business.

In many cases, there are dependencies between the various planning and forecasting processes. For example, the planning process of a sales group may depend on a planning process of an accounting group, because the sales group may need to know a budget it-will be given for an up-coming time period. In other words, the planning activities being performed by one organization may need to be coordinated with the planning activities of another organization. In such cases, an integration of planning functionality between various groups may be desirable. However, in a typical business, different groups may use different computer planning tools, and the integration among these tools may not be designed into the system.

A portal is a computer navigation tool, and is commonly used within enterprise computing systems as a way of enabling user access to various networked resources. For example, a portal may contain a user interface view that provides a user with access to selected information that the user may need to access during a normal day's work. In addition, portal systems for an organization may be role-based, which means that users with an identified role within the organization may be presented with portal views that are specifically designed to meet the particular needs of the role of that user, and different users with different roles may have different portal views. In addition, the portal may be designed to have various views that provide different types of information that the user may want to access, depending on the task that the user is performing. For example, a role-based portal designed for a sales user may have a sales lead view, and another view that provides access to financial information in a format that is tailored to the needs of the sales user. Portals in some cases also provide access to planning tools that a user may need to access.

SUMMARY

Generally, this document describes computing systems and methods that enable streamlined and consistent management of various different, although perhaps inter-related, planning projects or tasks being carried out in an organization. Generally, the described planning computing systems and methods enable effective observation and control of all of an organization's planning processes from a single user interface "cockpit," which may be referred to as a "planning view." In addition, the described planning computing systems and methods provide a user with user-specific and very easy-to-use planning views.

In one aspect, a planning monitor and control system is provided for use with an enterprise computing system. The planning monitor and control system comprises executable instructions that when executed by a processor generate a user interface planning visual display, or in other words, a planning view. The planning visual display includes a list view area containing a list of planning projects predefined to be included in a list of planning projects of interest to a user for whom the planning visual display is intended to be viewed. At least one of the listed planning projects includes an electronically linked electronic planning document that is created and maintained in an application software program module of the enterprise computing system that is separate from the planning monitor and control system. Planning information is generated in the linked planning document as part of the listed planning project to which the planning document is associated. The planning visual display also includes a planning project details view area in which non-final content from the linked planning document is displayed for the associated planning project included in the list view.

In various different implementations, one of more of the following features may also be included in the planning monitor and control system. The application software program module may be general purpose application software program such as an electronic spreadsheet application, a word processing document, or a database management program, for example. Additionally or alternatively, the application software program module is a transactional application program module, such as a customer relationship management program or an enterprise resource management program.

The user interface planning visual display may provide intermediate planning results prior to the availability of final planning results. The planning monitor and control system may contain information about planning projects being conducted in different business areas of the organization. The user interface planning visual display displays action areas that when selected initiate a planning computing process relating to a planning project identified in the list view area. The planning computing process may be an approval process for the planning project, or may be a request process for making an electronically forwarded request for data relating to a listed planning project, which electronically forwarded request will be forwarded for action by a person having responsibilities related to the listed planning project for which the request process relates.

The list view area may contain expandable project listings for viewing planning sub-projects for a listed planning project. In addition, the list view area may contain visual indicators that identify planning projects included in the list view that are the responsibility of a user for whom the planning view has been generated. The list view display may include planning projects for which the user is not responsible but which are related to the listed planning projects for which the user is responsible.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
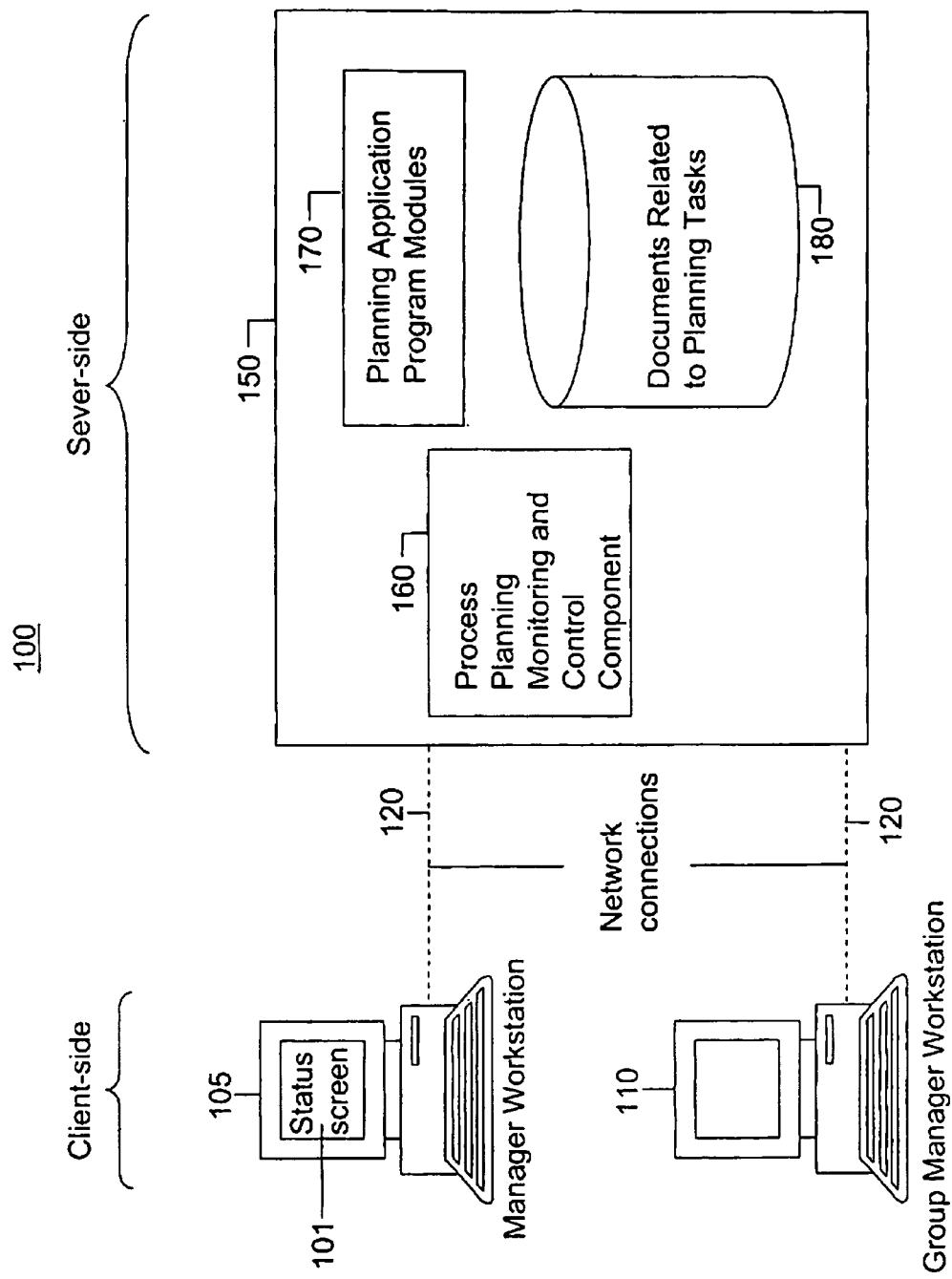
FIG. 1 is a block diagram of an example enterprise computing system that includes a planning monitoring and control system.

In the following description, there will first be provided a general description of various features that may be included in different implementations of planning computing systems and methods. In general, the planning computing systems and methods may be used in an enterprise computing system used by an entire business entity or organization. After a general description of various features the planning system may incorporate, there will be provided various example planning computing systems and methods, as well as example planning views.

Generally, an important component to provide for an integrated and effective planning view is a planning processes monitor component. The planning process monitor component generates a user interface view in which all of a user's relevant planning activities may be listed. This may include, for example, information on timelines about various different planning functions being performed, responsibilities and statuses for each of the various different planning activities, and results generated from the various planning activities. In addition, the planning process monitor component may also include collaboration features that may be used by a planning team, and that may be triggered within a planning process monitor view.

A planning process monitor user interface view may serve a single point of entry and observation for all planning processes within an organization, or for all planning processes with which a particular user is concerned. With this planning view, a manager is able to view relevant information that may be of concern to the manager. In addition, the manager may use the collaboration features to initiate, for example, deviations or exceptions to a plan, and may do so with just a few simple actions. Another useful feature of the planning process monitor computing component is the integration of information on interdependencies of the planning processes. For example, a user may be given the ability to view and maintain various prerequisites for a planning process, such as plan data availability from planning functions being prepared by others that the user needs before being able to perform other planning functions. This feature may be implemented by linking within the computing system groups that are responsible for the prerequisite plan data to a planning task that requires the data.

Various other features may be offered with the planning processes monitor module. For example, real-time planning results during planning execution may be made available in the planning view, with an ability for a user to drill down to a full report of the planning activity. Deviations of plan data may be displayed without the need for a user having to navigate to a planning entry tools. Plans, such as profit and loss plans, may be generated and viewed based on an integration of key plan data from preceding plans. Action items and workflows may be automatically or manually, and it is possible to keep track of these action items and workflows easily using the planning processes monitor view. In addition, summaries of planning results, such as "flash reports," may be automatically generated, and it is possible to keep track of these generated summaries easily. Risk maps may be generated based on deviation rules. In addition, various capabilities that are determined during a planning process may be easily forwarded and published.

In general, the planning systems and methods described in this document may be used for schedule-based monitoring and tracking of all planning, budgeting and forecasting processes from a manager's point of view. This may be valuable, for example, for managers with line of business responsibility within an organization with several lines of business, as well as for financial analysts with planning coordination responsibilities. Additionally, the planning systems and methods may support collaboration within planning teams by providing "collaboration room" like functions from which planning functions may be initiated, for example, including the distribution of relevant top-down plans and related documents and guidelines. In addition, the planning system and tools described in this document may be used to get a quick overview of the nature and structure of planning functions in the entire organization, and at all levels of the organization, the input and output requirements per planning process of the entire organization, and the interdependencies of the individual planning procedures.

FIG. 1 is a block diagram of an enterprise computing system 100 in which planning computing modules and methods described in this document may be implemented. The enterprise computing system 100 in this example uses a client-server arrangement and, as such, includes client-side and server-side components. The server-side components 150 include a process planning monitoring and control component 160, which is a component that integrates various distributed planning functions and data performed on different systems within the enterprise computing system 100. The server-side components 150 also includes planning application program modules 170 shown as a single block in FIG. 1 for simplicity, although there will in most cases be many such planning application program modules 170 in a given enterprise computing system. Finally, the server-side components 150 also include a repository 180 of various planning documents that are created by the planning application program modules 170. Again, the repository 180 of planning documents is shown as a single repository, although it will be understood that the planning documents may be stored in many repositories distributed throughout the landscape of the enterprise computing system.

FIG. 1 shows two example client-side workstations for illustration purposes only. The workstations include a manager workstation 105, which may be, for example, a workstation that is used by a high-level manager, or perhaps someone working for a high-level manager, who may have access to all planning information and data created in the entire enterprise computing system 100. In addition, there is a group manager workstation 110, which may, for example, be a workstation of a user in a sales group, for example. The workstations 105, 110 use network connections 120 to access the server-side computing components 150.

The process planning monitoring and control component 160 contains executable program instructions that when executed by a process perform various planning monitoring and control functions. These functions include generating various user interface views that make up a planning view. An example of a series of user interface views that may comprise a planning view will be provide later in this document. In addition, the functions performed by the planning monitor and control component 160 also include various communication functions that allow for collaboration between different planning groups.

Various groups within an organization may make use of various different planning computer software applications 170 to help perform the planning functions. Planning documents may be created during the planning process and may include, for example, strategies, objectives, market trends, financial forecasts and other planning data for the is business as a whole, or a particular sector of the enterprise. The planning software applications and documents may be external to the planning software application, for example, the planning documents may be created and maintained generated by general purpose application software programs such as a word processing application, a spreadsheet software application, or a database application. In addition, the planning document or data may be created and maintained by a transactional software application, such as a Customer Relations Management (CRM) system, or an Enterprise Resource Planning (ERP) program.

In general, the system 100 may store, in repository 180, a user's complete or intermediate planning documents generated by a software application 170, and a manager, using workstation 105, may use the process planning monitor and control component 160 to access planning documents stored in repository 180, and also to generate a view 101 on the workstation 105 of the progress and information about a planning project. The subordinate 110 planning documents stored in repository 180 that may be used in generating a planning progress view 101 may be completed or intermediate planning documents. They may be linked to planning projects identified in the process planning monitor and control component 160.

The application module 170 may include commonly used enterprise computer transactional software applications that may be used for the purpose of enterprise planning, and include, for example, a CRM software application, an ERP software application, and a financial management (FM) software application, to name some examples. In addition, the application module 170 may include general purpose software applications such as a spreadsheet application, for example, Microsoft Excel®. These software applications 170 may be used for enterprise planning projects by employees of all levels of the enterprise. Planning documents, which may include spreadsheets or files that may contain enterprise planning data, may be stored in a repository 180 as a collection of database objects, wherein predefined database object fields may be used to store associations between a field and a user entry. The supervisor view software module 160 may store information that links planning documents from sub-projects to the overall, or "master" project.

The process planning monitor and control component 160 may include software application instructions that, when executed, access linked planning documents from the document repository 180, whether in completed or intermediate form, and generate an assimilated view 101 of all or part of the progress of the planning project. The component 160 may be configurable such that users of the system 100 may be given certain rights, or granted access to certain planning documents 180 when requesting a planning project overview. For example, a sales manager may be given access-rights to "sales" planning documents across the enterprise, but may be prohibited from accessing "human resources" planning documents for privacy considerations. However, a president of an enterprise may be able to view any planning data from any sector. The supervisor view module 160 may generate a planning project progress view which may contain a high-level overview of the progress of individual planning projects, or it may contain detailed planning information derived from the high-level overview. For example, a manager may wish to view the progress of a planning project in a finance department. The manager may view the overall progress, i.e., the extent to which the project may be completed, as well as drill down to the fine details of the planning documents that were assimilated to prepare the view 101, such as individual purchase orders from the finance department.

Figure 2:
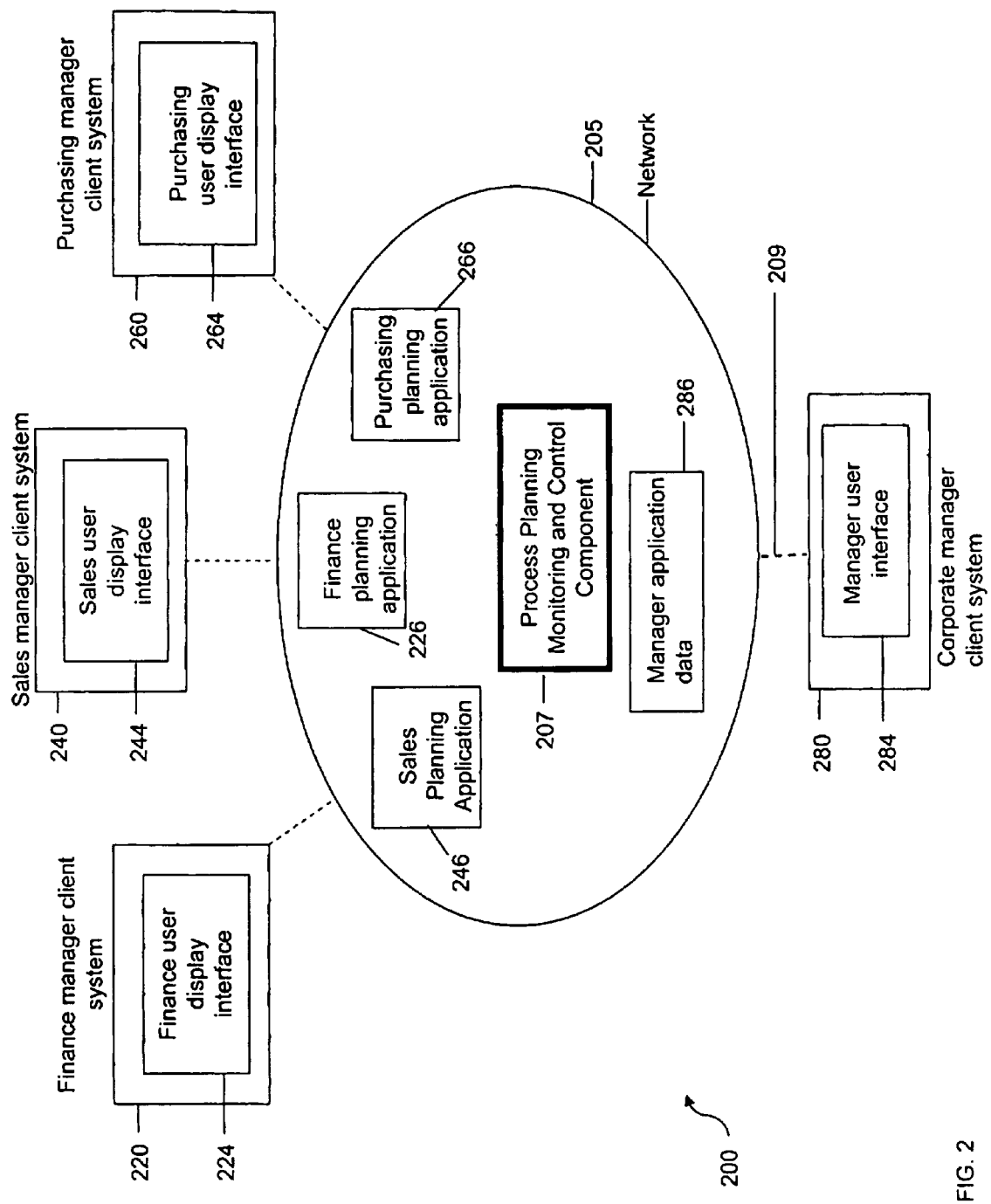
FIG. 2 is a block diagram of another example of an enterprise computing system that includes a planning monitoring and control system and various function planning components.

FIG. 2 is a more detailed block diagram of an enterprise computing system 200 for an enterprise that includes multiple divisions that may be called upon by an executive to prepare planning reports for their respective sectors. In the FIG. 2 example, four client systems—namely, a first client device 220 used by a finance person, a second client device 240 used by a sales person, a third client device 260 used by a purchasing manager, and fourth client device 280 used by a corporate manager 280—may be connected to an enterprise network 205 through network connections 209. Each manager may have a user interface 224, 244, 264, 284, which they may use for preparing the requested planning documents and for utilizing the process planning monitoring and control component 207. The finance, sales, purchasing, and corporate managers may store their respective planning documents 226, 246, 266, 286 in various database repositories within a networked computing system 205.

In one example of how the system shown in FIGS. 1 and 2 may be used, all of the managers may be involved in an enterprise-wide planning project to forecast the success of a particular enterprise venture over the next ten years, and the planning project may be anticipated to take several months to complete. The three division managers (finance, sales, and purchasing) may be asked to develop planning reports for their respective divisions, while the corporate manager may manage the overall progress of the project. As the project progresses, the managers may add relevant planning data to their planning report and may update their planning documents periodically to reflect the newly-added information. While a particular planning report or group of reports may not yet be complete, the corporate manager may access the process planning monitor and control component 207 to view assimilated intermediate planning document data 226, 246, 266 in a format that reflects both the overall and individual progress of the project(s). The division managers may be granted unique, individual permissions for the type of data they may be allowed to access, and may therefore be able to access application data from the other managers. For example, the finance manager may require planning information from sales and purchasing application data in order to accurately reflect the present and future goals of the finance division. In this case, the supervisor view module 207 may access sales and purchasing application data, and may assimilate the planning information therein with the finance planning application data.

In another example use, the corporate manager may wish to view the overall progress of the enterprise planning project at some time after the project has begun. The corporate manager may access the supervisor view module 207 to retrieve all relevant planning information from all of the enterprise divisions, even if the planning reports from the divisions are not yet complete. The planning monitor and control component 207 may collect data from finance, sales, and purchasing planning documents 226, 246 and 266, respectively, and generate a view containing assimilated document data that represents the overall progress of the entire planning project. The corporate manager may then require more detailed information than just an overall progress view, however, and in that case, may access, or "drill-down" into the finer details of the planning data from any of the divisions whose data are compiled in the view provided on the manager's user interface 284.

Figure 3:
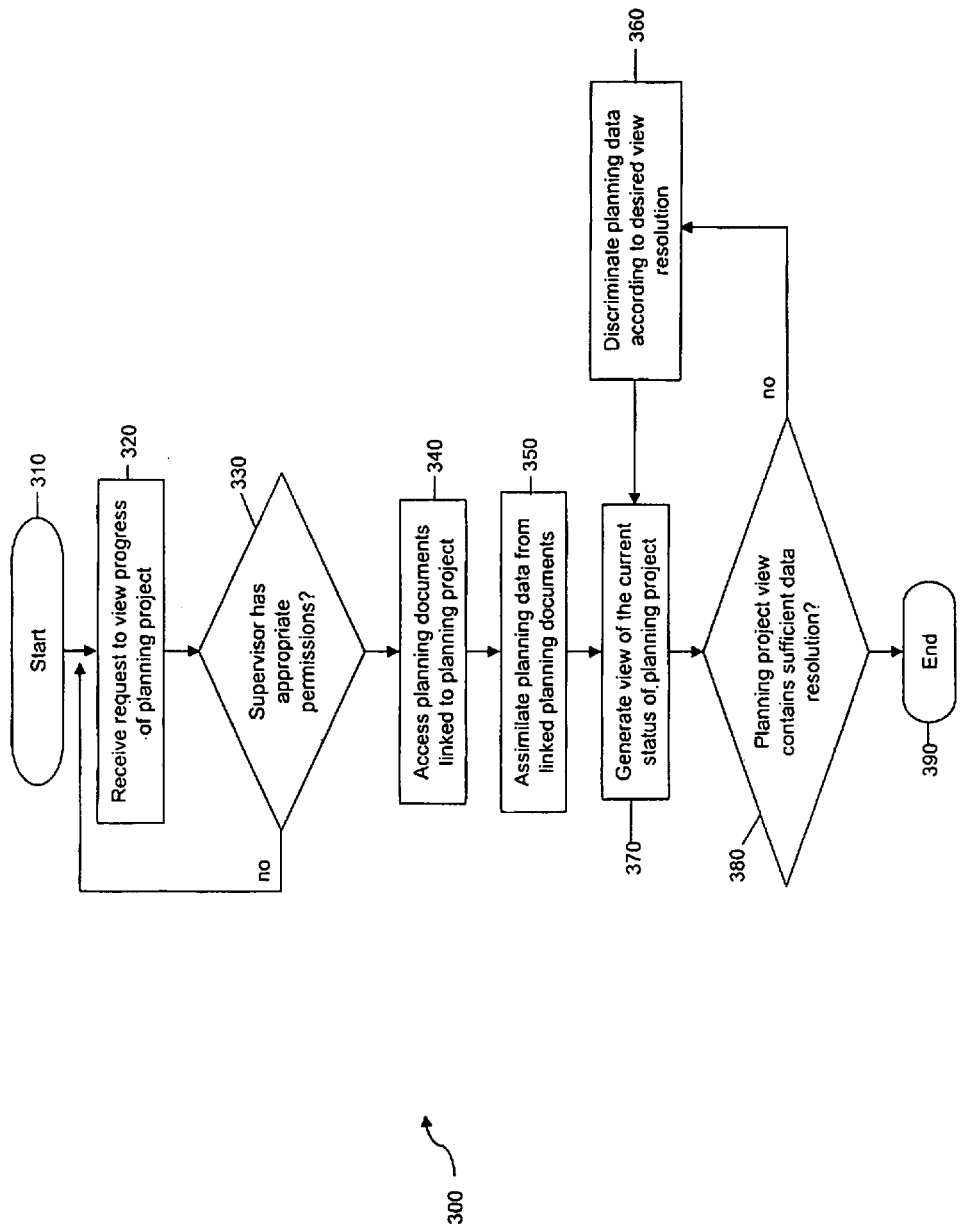
FIG. 3 is a flow diagram illustrating a method of using a planning view to display planning information.

FIG. 3 is a flow diagram 300 that includes method steps which may be taken to generate a progress view of a planning project within an enterprise using, for example, a system of the types shown in FIGS. 1 and 2. First, at step 320, the system 100 may receive a request from a supervisor to view the status of a planning project. Permissions for that user may be checked at step 330 to determine the access rights the user may have, and, therefore, what planning information the user may be able to view. With appropriate permissions, the supervisor view module 160 or 207, for example, may access planning documents from across the enterprise network for the relevant planning project, as shown in step 340. At step 350, the supervisor view module may assimilate relevant planning data from the planning documents from step 340, and, at step 370, may generate output in the form of a planning view that may reflect the collected planning document data. In some cases, a user of the supervisor view module may require higher resolution in the displayed output. For example, the user may wish to see the actual data comprising the document, step 380, at which time the planning data may be discriminated to provide a level of view detail suitable to the user, shown as step 360.

Figure 4:
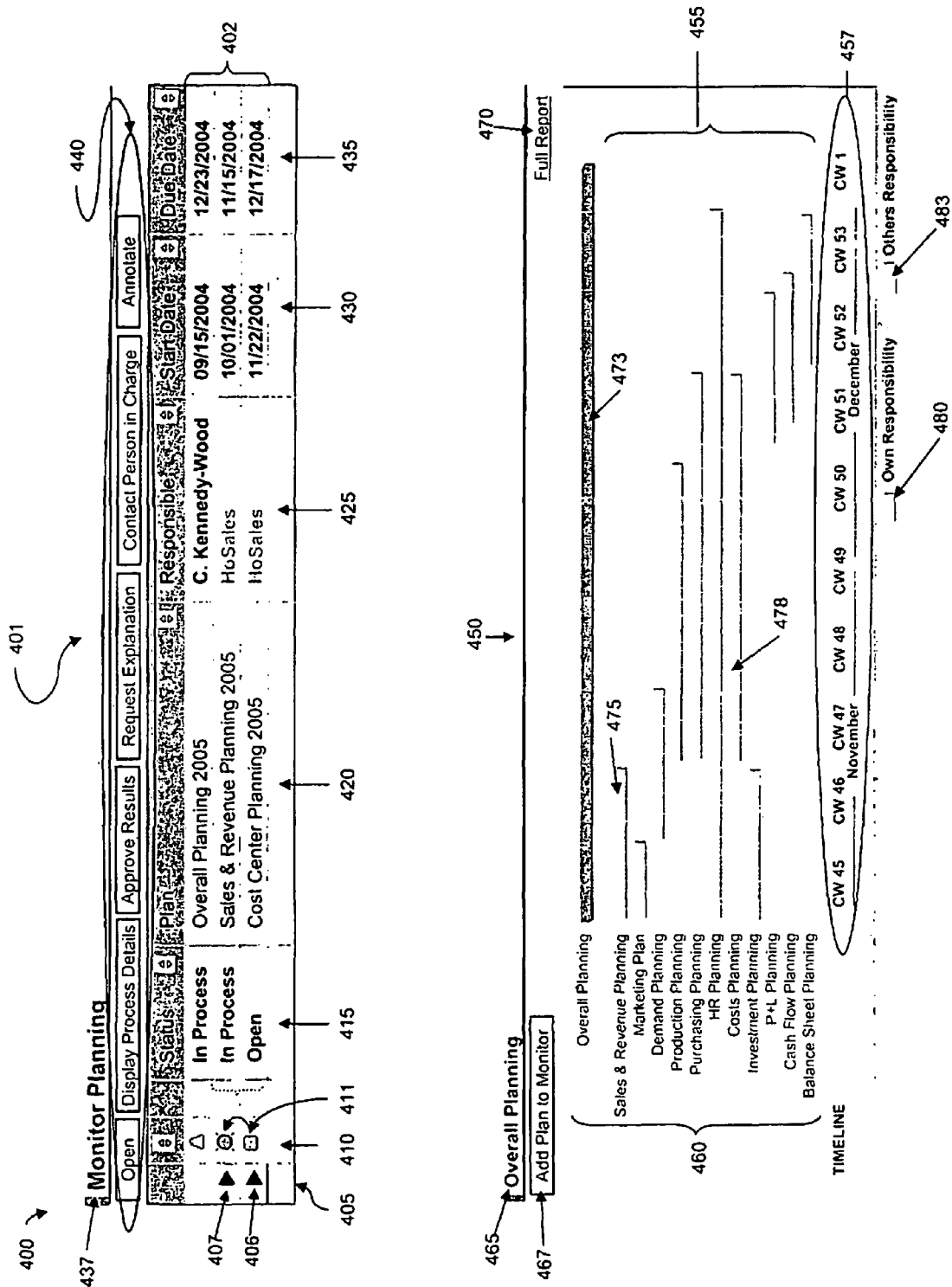
FIG. 4 is an example user interface screen snapshot of a planning view for a user having a sales manager role.

FIG. 4 is a user interface screen snapshot 400 which may illustrate some of the functionalities described above. In this example, the user interface screen may be a planning view screen for a user having a sales manager role, although a common layout of the planning view screen would apply for different user roles. The snapshot 400 is divided into an upper "Monitor Planning" 401 section and a lower "Overall Planning" 450 section. Generally, the upper section 401 of the screen provides overview information that identify various planning projects or tasks of various groups within the organization where the user may need to be concerned with the-planning projects, while the lower section 450 of the screen provides details of a selected planning task. The monitor planning section 401 may also contain planning information that has been either entered by users responsible for the planning project or gathered from linked planning documents across an enterprise relating to a particular planning project. The monitor planning section 401 may indicate the status, plan, people in charge, and relative dates of each of the planning projects that help to summarize and help provide a useful high-level view of the planning situation within the organization. The lower overall planning view 450 may include a graphical representation of the progress of the planning projects listed in the monitor planning view 401. The overall planning view 450 may enable the user to visualize planning projects by graphically projecting the projects and their level of completion against a timeline.

The monitor planning section 401 may include user selectable tabs 440, which may allow the user to execute tasks relating to planning activities, as well as choose the planning content that may be shown in a tabular view 402 below. Planning activities that the user may access using the tabs 440 may include executing software instructions to open a planning view or display the project details, but may also include more dynamic activities, such as approving planning processes or contacting personnel involved in the project. For example, a supervisor may view a partial planning project summary, wherein a subordinate may have requested approval from the supervisor prior to continuing. The supervisor may use one of the tabs 440 to send a communication, which may include a direct approval of their progress, or requesting an explanation for certain data, or, the superior may directly contact the subordinate's person in charge, or, the supervisor may directly annotate the data.

The planning projects listed in the tabular, or list view, section 402 of the upper section 401 are those projects with which the user is concerned. For example, the listed projects may include both projects for which the user is directly responsible, and projects that relate to the planning projects for which the user is responsible. For example, if the planning user needs information from another planning project in order to perform his or her planning project, then such a prerequisite planning project may be include in the user's planning view monitor planning section 401. In addition, the planning project included in a first row of the tabular section 402 will typically be an overall planning project, of which all of the other planning projects of the organization are a sub-set. In the case of the FIG. 4 example, the first planning project is identifies a "Overall Planning 2005."

The triangles 406 and 407 in the planning project rows may indicate projects for which the planning user whose screen is displayed is directly responsible. An absence of such a triangle would indicate that the user is not responsible for the planning project, but the planning project is nevertheless one with which the user is concerned. In addition, the triangles 406 and 407 may also be "action areas" that operate to expand the list provide in the tabular section 402 to show planning sup-projects that are part of a larger planning project. This will be illustrated in the FIG. 5 example.

Column 410 of the tabular section 402 may include graphical indicators to alert the user to a particular entry and may serve to warn of missed or upcoming deadlines, for example. Column 415 may contain a textual status indicators of a planning project. For the exemplary data fields in the snapshot 400, the statuses of "Overall Planning 2005," "Sales & Revenue Planning 2005," and "Cost Center Planning 2005" (column 420) are shown in the status column 415. The persons responsible for each of the planning projects may be associated with their respective projects in a column 425, and the start date 430 and due date for completion of their project 435 may also be included in the table 402.

The lower overall planning section 450 may provide the user with a view of the progress of a particular one of the planning projects. In addition, information about that one project may be a graphically derived representation of planning document data contained in the monitor planning section 401, but may also include planning data not shown in the monitor planning section 401. The lower section 450 may include planning information for all of the relevant planning projects that make up the overall planning project, which may include a project title area list 460, a timeline display 457, and a bar indicator section 455 which may indicate the start- and due-date for each of the individual projects along the timeline of display 457. The overall planning section 450 may include user action areas to execute certain functions relating to the planning view, such as the "Add Plan to Monitor" 467 or "Full Report" 470 areas. The "Add Plan to Monitor" action area 467 may allow a user to select one or more of the listed planning projects 460 and add them to the monitor planning section table 402 to view more detailed information than is given in the overall planning section 450. Likewise, the user may utilize a full report action button 470 to generate a report containing all of the details for one or more selected planning projects in the list 460. The graphical representation of planning project timelines 455 may be customized to indicate the responsibility of the project shown in the view by the use of a color-coded legend 480, 483.

The exemplary planning information in the FIG. 4 screen snapshot 400 indicates that "Overall Planning 2005" is the overall planning project and contains various planning sub-projects. In this example, a high-level manager of an enterprise may be viewing the screen snapshot 400, and may have access to all planning documents across the enterprise. The progress of the overall project is indicated in the overall planning section 450, and from the graphical representation on -the timeline 473. From this information, the manager may be able to forecast the completion date for the overall project, as well as all of the sub-projects. The president may wish to view more detailed information about the overall project 473, a sales and revenue sub-project 475, and a costs sub-project 478, perhaps to gain a better understanding of who is in charge of the sub-projects or what the current status of their project may be. The president may select the overall project 473, the sales & revenue sub-project 475, and the costs sub-project 478 from the list 460, and select "Add Plan to Monitor" 467 to generate a tabular view 402 of the planning information in the monitor planning view 401. The manager may interact directly with the persons responsible for the projects, for example, by making contact, approving or disapproving requests or results, requesting explanations, or annotating the projects, or performing any interaction according to the list of action items 440 available in the monitor planning view 401.

Figure 5:
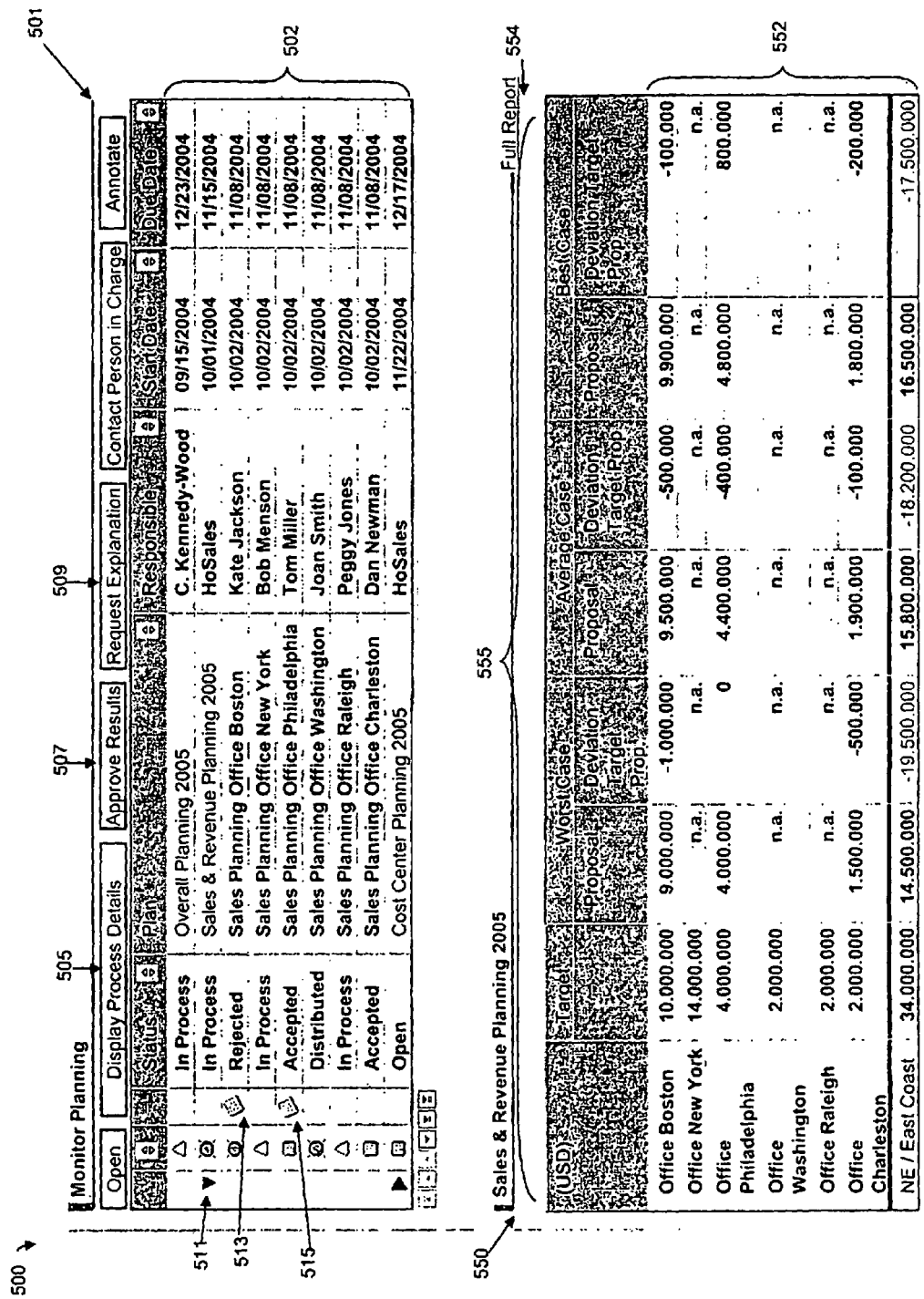
FIG. 5 is an example user interface screen snapshot of a different screen of the planning view shown in FIG. 4.

FIG. 5 further illustrates features that a user may employ to visualize higher-resolution planning data than that shown in the screen snapshot 400 of FIG. 4. In other words, the FIG. 5 screen snapshot 500 is another screen of a planning view for a user that has a sales manager role. Similar to the screen snapshot 400 in FIG. 4, a list view 502 in FIG. 5 may contain tabular data that may have been collected by the system when a user executed commands to view the status of a planning project. The tabular data may be the most current of planning documents that are linked to the project. The snapshot 500 includes a top and bottom view area similar to 400, wherein the top section 501 may represent views for monitoring the progress of planning projects, and the bottom section 550 may present detailed, intermediate planning data 552 for a selected entry from the monitor planning list 502, in this example, "Sales & Revenue Planning 2005." The list of planning projects in the monitor planning view 501 may be expanded to view more detailed information for the Sales & Revenue Planning 2005 planning project, which may have been generated by a supervisor selecting an action area 511 to cause a new view to be displayed, which view may include the planning sub-projects under the general description "Sales & Revenue Planning 2005."

The tabular data 552 under "Sales and Revenue planning 2005" may include the planning projects from several offices that comprise the sales and revenue geographic centers (Boston, New York, Philadelphia, etc.). With each entry there may be listed the planning project status, the persons responsible, and important dates relevant to the project. In this example, the rows representing the planning details for Boston and Philadelphia sales centers show an indicator 513, 515, which may be communications from managers working on the planning reports to the supervisor viewing the screen snapshot 500. In this case, the supervisor may select the appropriate action area to display the communication and subsequently send a response. Alternatively, the two indicators 513, 515 may represent a request for the supervisor to approve their report, at which time the supervisor may select an appropriate action area on the screen such as "Approve Results" 507 or "Request Explanation" 509 to directly attend to these communications.

In some cases, the supervisor may wish to view high-resolution data for a particular planning report or project. The bottom view 550 may include such information, for example, if the supervisor selects the "Sales & Revenue Planning 2005" row in the upper screen 502, and performs an action on the "Display Process Details" action area 505. The system 100 may then generate the displayed view 550 which may include up-to-date, high-resolution planning data from the intermediate planning reports (Boston, New York, Philadelphia, etc.) 552. The table 555 may include any type of planning data that the enterprise may use for its overall planning objectives. If necessary, the user may increase the level of resolution by selecting one of the entries 552 in the tabular data and selecting "Full Report" 554.

Figure 6:
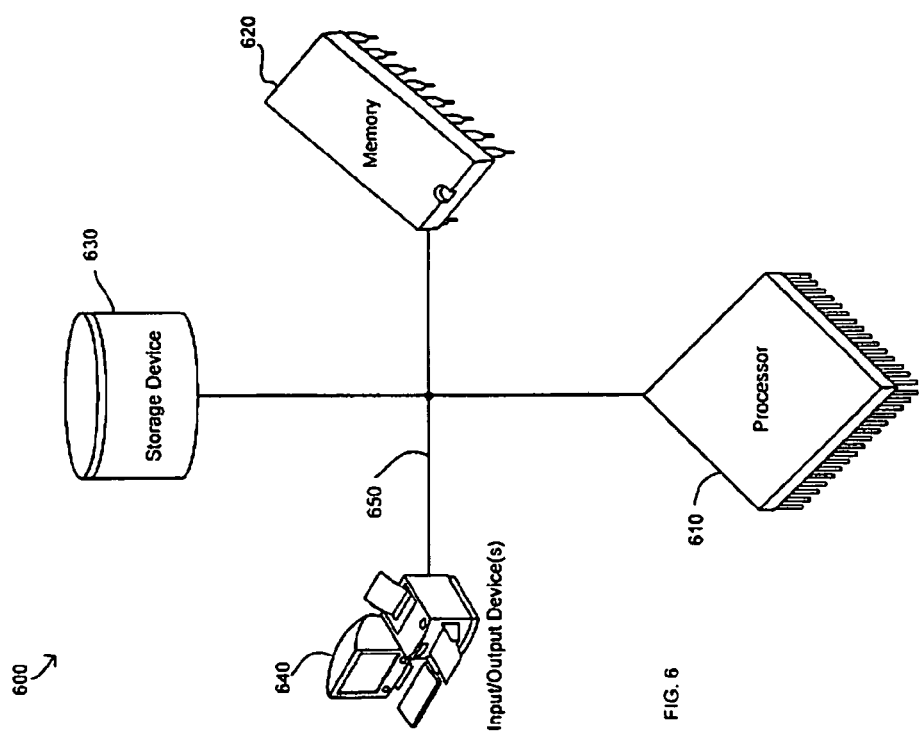
FIG. 6 is an exemplary block diagram of a computing system.

FIG. 6 is a schematic diagram of a generic computer system 600. The-system 600 can be used in the methods 300 and 500 described above, according to one implementation. For example, the system 600 may be included in either or both of the administrator workstation 115 and the other computing devices that execute the software platform that includes the logistic ex%cution computing module 150.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 700. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution.of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or al. Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A storage device for use with a planning monitor and control system, the planning monitor and control system for use with an enterprise computing system, the storage device comprising:
 a non-transitory computer readable medium comprising executable instructions that when executed by a processor-coupled to a display device result in:
  a planning view on a display device, the planning view comprising:
   a list view area containing a list of planning projects predefined to be included in a list of planning projects of interest to a user for whom the planning visual display is intended to be viewed, at least one of the listed planning projects including a first electronically linked electronic planning document that is created and maintained by a first application software program of the enterprise computing system that is separate from the planning monitor and control system, at least one other of the listed planning projects including a second electronically linked electronic planning document that includes a timeline and is created and maintained by a second application software program of the enterprise computing system that is different from the first application software program and separate from the planning monitor and control system, wherein planning information is generated in the first linked planning document as part of the listed planning project to which the planning document is associated, wherein planning information is generated in the second linked planning document as part of the listed planning project to which the second linked planning document is associated and wherein the list view area includes an indicator to warn of a missed or upcoming deadline for one of the listed planning projects; and
   a planning project details view area in which non-final content from the first linked planning document is displayed for the associated planning project included in the list view;
   wherein the planning view displays action areas that when selected initiate a planning computing process; and
   wherein the planning computing process is a request process for making an electronically forwarded request for data relating to a listed planning project.

2. The storage device of claim 1, wherein the indicator warns of a missed deadline for the respective one of the planning projects.

3. The storage device of claim 1, wherein the indicator warns of an upcoming deadline for the respective one of the planning projects.

4. The storage device of claim 1, wherein the list view area includes a due date for one of the planning projects.

5. A storage device for use with a planning monitor and control system, the planning monitor and control system for use with an enterprise computing system, the storage device comprising:
 a non-transitory tangible computer readable medium comprising executable instructions that when executed by a processor-coupled to a display device result in:
  a planning view on the display device, the planning view comprising:
   a list view area containing a list of planning projects predefined to be included in a list of planning projects of interest to a user for whom the planning visual display is intended to be viewed, at least one of the listed planning projects including a first electronically linked electronic planning document that is created and maintained by a first application software program of the enterprise computing system that is separate from the planning monitor and control system, at least one other of the listed planning projects including a second electronically linked electronic planning document that includes a timeline and is created and maintained by a second application software program of the enterprise computing system that is different from the first application software program and separate from the planning monitor and control system, wherein planning information is generated in the first linked planning document as part of the listed planning project to which the first linked planning document is associated, wherein planning information is generated in the second linked planning document as part of the listed planning project to which the second linked planning document is associated and wherein the list view area includes an indicator to warn of a missed or upcoming deadline for one of the listed planning projects; and a planning project details view area in which non-final content from the first linked planning document is displayed for the associated planning project included in the list view;

wherein the planning view displays action areas that when selected initiate a planning computing process; and wherein the planning computing process is a request process for making an electronically forwarded request for data relating to a listed planning project.

6. The storage device of claim 1, wherein the first application software program is an electronic spreadsheet application.

7. The storage device of claim 1, wherein the first application software program is a transactional application program module.

8. The storage device of claim 7, wherein the transactional application program is a customer relationship management software application.

9. The storage device of claim 1, wherein the planning view provides intermediate planning results prior to the availability of final planning results.

10. The storage device of claim 1, wherein the planning view includes information about planning projects being conducted in different business areas of the organization.

11. The storage device of claim 1, wherein the planning computing process relates to a planning project identified in the list view area.

12. The storage device of claim 11, wherein the planning computing process is an approval process for the planning project.

13. The storage device of claim 11, wherein the electronically forwarded request will be forwarded for action by a person having responsibilities related to the listed planning project for which the request process relates.

14. The storage device of claim 1, wherein the list view area contains expandable project listings for viewing planning sub-projects for a listed planning project.

15. The storage device of claim 1, wherein the list view area contains visual indicators that identify planning projects included in the list view that are the responsibility of a user for whom the planning view has been generated.

16. The storage device of claim 15, wherein the list display includes planning projects for which the user is not responsible but which are related to the listed planning projects for which the user is responsible.

17. The storage device of claim 1, wherein the indicator warns of a missed deadline for the respective one of the planning projects.

18. The storage device of claim 1, wherein the indicator warns of an upcoming deadline for the respective one of the planning projects.

19. The storage device of claim 1, wherein the list view area includes a plurality of indicators each to warn of a missed or upcoming deadline for a respective one of the planning projects.

20. The storage device of claim 1, wherein the list view area includes a due date for one of the planning projects.

21. The storage device of claim 1, wherein the list view area includes a plurality of due dates each associated with a respective one of the planning projects.

22. A planning monitor and control system for use with an enterprise computing system, the planning monitor and control system comprising:

a display device; and a processor coupled to the display device and to execute instructions that result in a planning view on the display device, the planning view comprising:

a list view area containing a list of planning projects predefined to be included in a list of planning projects of interest to a user for whom the planning visual display is intended to be viewed, at least one of the listed planning projects including a first electronically linked electronic planning document that is created and maintained by a first application software program of the enterprise computing system that is separate from the planning monitor and control system, at least one other of the listed planning projects including a second electronically linked electronic planning document that includes a timeline and is created and maintained by a second application software program of the enterprise computing system that is different from the first application software program and separate from the planning monitor and control system, wherein planning information is generated in the first linked planning document as part of the listed planning project to which the first linked planning document is associated, wherein planning information is generated in the second linked planning document as part of the listed planning project to which the second linked planning document is associated and wherein the list view area includes an indicator to warn of a missed or upcoming deadline for one of the listed planning projects; and a planning project details view area in which non-final content from the first linked planning document is displayed for the associated planning project included in the list view;

wherein the planning view displays action areas that when selected initiate a planning computing process; and wherein the planning computing process is a request process for making an electronically forwarded request for data relating to a listed planning project.

23. The storage device of claim 22, wherein the indicator warns of a missed deadline for the respective one of the planning projects.

24. The storage device of claim 22, wherein the indicator warns of an upcoming deadline for the respective one of the planning projects.

25. The storage device of claim 22, wherein the list view area includes a due date for one of the planning projects.

26. A non-transitory storage medium for use with a planning monitor and control system, the planning monitor and control system, the storage medium comprising executable instructions that when executed by a processor-coupled to a display device result in:
    a planning view on the display device, the planning view comprising:
        a list view area containing a list of planning projects predefined to be included in a list of planning projects of interest to a user for whom the planning visual display is intended to be viewed, at least one of the listed planning projects including a first electronically linked electronic planning document that is created and maintained by a first application software program of the enterprise computing system that is separate from the planning monitor and control system, at least one other of the listed planning projects including a second electronically linked electronic planning document that includes a timeline and is created and maintained by a second application software program of the enterprise computing system that is different from the first application software program and separate from the planning monitor and control system, wherein planning information is generated in the first linked planning document as part of the listed planning project to which the planning document is associated, wherein planning information is generated in the second linked planning document as part of the listed planning project to which the second linked planning document is associated and wherein the list view area includes an indicator to warn of a missed or upcoming deadline for one of the listed planning projects; and
    a planning project details view area in which non-final content from the first linked planning document is displayed for the associated planning project included in the list view;
    wherein the planning view displays action areas that when selected initiate a planning computing process; and
    wherein the planning computing process is a request process for making an electronically forwarded request for data relating to a listed planning project.

* * * * *